United States Patent
Sudbrink et al.

(10) Patent No.: US 9,615,500 B2
(45) Date of Patent: Apr. 11, 2017

(54) AGRICULTURAL AUXILIARY TILLAGE IMPLEMENT CONTROL

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 183 days.

(21) Appl. No.: 14/534,674

(22) Filed: Nov. 6, 2014

(65) Prior Publication Data

US 2015/0129264 A1    May 14, 2015

Related U.S. Application Data

(60) Provisional application No. 61/903,435, filed on Nov. 13, 2013.

(51) Int. Cl.
| | |
|---|---|
| *A01B 63/24* | (2006.01) |
| *A01B 73/00* | (2006.01) |
| *A01B 73/04* | (2006.01) |
| *A01B 63/32* | (2006.01) |
| *A01B 49/02* | (2006.01) |

(52) U.S. Cl.
CPC ............ *A01B 63/32* (2013.01); *A01B 49/027* (2013.01); *A01B 73/046* (2013.01); *A01B 73/048* (2013.01)

(58) Field of Classification Search
CPC ......... A01B 63/24; A01B 63/32; A01B 73/00; A01B 73/04

USPC ........................................ 172/614, 663, 668
See application file for complete search history.

(56) References Cited

U.S. PATENT DOCUMENTS

| | | | |
|---|---|---|---|
| 3,633,679 A | 1/1972 | Dahlberg et al. | |
| 4,489,789 A | 12/1984 | Pearce | |
| 4,884,919 A | 12/1989 | Moore | |
| 5,234,060 A | 8/1993 | Carter | |
| 5,653,292 A | 8/1997 | Ptacek et al. | |
| 5,833,011 A | 11/1998 | Boertlein | |
| 6,068,061 A | 5/2000 | Smith et al. | |
| 6,076,611 A | 6/2000 | Rozendaal et al. | |

(Continued)

OTHER PUBLICATIONS

Ecolo-Tiger 870 Brochure, CNH America LLC, Dec. 31, 2009 (12 pages).

*Primary Examiner* — Gary Hartmann
(74) *Attorney, Agent, or Firm* — Rebecca L. Henkel; Rickard K. DeMille

(57) ABSTRACT

An agricultural tillage implement includes a main section including a hitch extending in a travel direction, a plurality of foldable wing sections coupled with the main section, at least one auxiliary implement assembly coupled to each of the wing sections and a control system. Each auxiliary implement assembly includes at least one support member, at least one pivotal arm pivotally coupled to the support member, at least one actuator coupled to both the support member and the pivotal arm and a ground contacting implement coupled to the pivotal arm. The control system is configured to actuate the actuators to control a position of each ground contacting implement in each of the sections when the agricultural implement is transitioning to a transport mode.

17 Claims, 10 Drawing Sheets

(56) References Cited

U.S. PATENT DOCUMENTS

| | | |
|---|---|---|
| 6,550,543 B1 * | 4/2003 | Friggstad .............. A01B 51/04 172/311 |
| 6,554,078 B1 | 4/2003 | McDonald |
| 6,681,868 B2 | 1/2004 | Kovach et al. |
| 6,761,120 B2 | 7/2004 | Kovach et al. |
| 6,763,896 B1 | 7/2004 | Hurtis |
| 6,843,047 B2 | 1/2005 | Hurtis |
| 6,871,709 B2 | 3/2005 | Knobloch et al. |
| 7,065,945 B2 | 6/2006 | Hurtis |
| 7,513,316 B2 | 4/2009 | Ruckle et al. |
| 7,766,093 B2 | 8/2010 | Becker et al. |
| 7,806,197 B2 | 10/2010 | Steinlage et al. |
| 8,006,775 B2 | 8/2011 | Steinlage et al. |
| 8,047,299 B2 | 11/2011 | Hurtis et al. |
| 8,302,700 B2 | 11/2012 | Kovach et al. |
| 8,430,179 B2 | 4/2013 | Van Buskirk et al. |
| 9,247,687 B2 * | 2/2016 | Gray .................... A01B 61/044 |
| 9,253,937 B2 * | 2/2016 | Horsch ................ A01B 49/027 |
| 2011/0284252 A1 | 11/2011 | Friggstad et al. |
| 2012/0227991 A1 | 9/2012 | Hake et al. |
| 2015/0156955 A1 * | 6/2015 | Sudbrink ............. A01B 73/065 172/1 |
| 2015/0156956 A1 * | 6/2015 | Sudbrink ............. A01B 73/065 172/669 |
| 2015/0156957 A1 * | 6/2015 | Sudbrink ............. A01B 73/065 172/1 |
| 2015/0156961 A1 * | 6/2015 | Sudbrink ............. A01B 73/065 172/1 |

* cited by examiner

AGRICULTURAL AUXILIARY TILLAGE IMPLEMENT CONTROL

CROSS REFERENCE TO RELATED APPLICATIONS

This is a non-provisional application based upon U.S. provisional patent application Ser. No. 61/903,435, entitled "AGRICULTURAL AUXILIARY TILLAGE IMPLEMENT CONTROL", filed Nov. 13, 2013, which is incorporated herein by reference.

BACKGROUND OF THE INVENTION

1. Field of the Invention

The present invention relates to agricultural implements, and, more particularly, to the control of auxiliary tillage implements coupled to agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning. Examples of which include ploughing (overturning with moldboards or chiseling with chisel shanks), rototilling, rolling with cultipackers or other rollers, harrowing, and cultivating with cultivator shanks.

Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing tends to produce a rough surface finish and significantly subsoil effects, whereas secondary tillage tends to produce a smoother surface finish, such as that required to make a good seedbed for many crops. Harrowing and rototilling often combine primary and secondary tillage into one operation.

Auxiliary implements are often coupled to a primary implement so that further processing of the soil can be accomplished in a single pass over the field. When wide implements are folded for transportation purposes the auxiliary implements can interfere with the folding process.

What is needed in the art is an easy to use mechanism to enable auxiliary implements to be compatible with a folding main implement.

SUMMARY OF THE INVENTION

The present invention provides a tillage implement that has several tilling sections with the ability to independently control the positioning of auxiliary implements as sections of the underlying unit are folded for transport.

The invention in one form is directed to an agricultural tillage implement including a main section having a hitch extending in a travel direction, a plurality of foldable wing sections coupled with the main section, at least one auxiliary implement assembly coupled to each of the wing sections and a control system. Each auxiliary implement assembly includes at least one support member, at least one pivotal arm pivotally coupled to the support member, at least one actuator coupled to both the support member and the pivotal arm and a ground contacting implement coupled to the pivotal arm. The control system is configured to actuate the actuators to control a position of each ground contacting implement in each of the sections when the agricultural implement is transitioning to a transport mode.

The invention in another form is directed to a control system of an agricultural tillage implement. The implement has a main section including a pull hitch extending in a travel direction, a plurality of foldable wing sections coupled with the main section, at least one auxiliary implement assembly coupled to each of the wing sections and a control system. Each auxiliary implement assembly includes at least one support member, at least one pivotal arm pivotally coupled to the support member, at least one actuator coupled to both the support member and the pivotal arm and a ground contacting implement coupled to the pivotal arm. The control system has a controller configured to actuate the actuators to control a position of each ground contacting implement in each of the sections when the agricultural implement is transitioning to a transport mode.

The invention in yet another form is directed to a method of controlling a position of ground contacting portions of auxiliary implement assemblies coupled to a plurality of foldable sections of tilling assemblies of an agricultural implement. The method including the step of independently actuating a plurality of actuators to control a position of each ground contacting portion of the auxiliary assembly as each of the foldable sections of the agricultural implement is transitioning to a transport mode from a field mode.

An advantage of the present invention is that the components of the auxiliary implement are moved to a non-interfering position as the sections of the agricultural implement are folded to the transport mode.

Another advantage of the present invention is that the control system can be integrated with the control system that is used to fold the agricultural implement.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
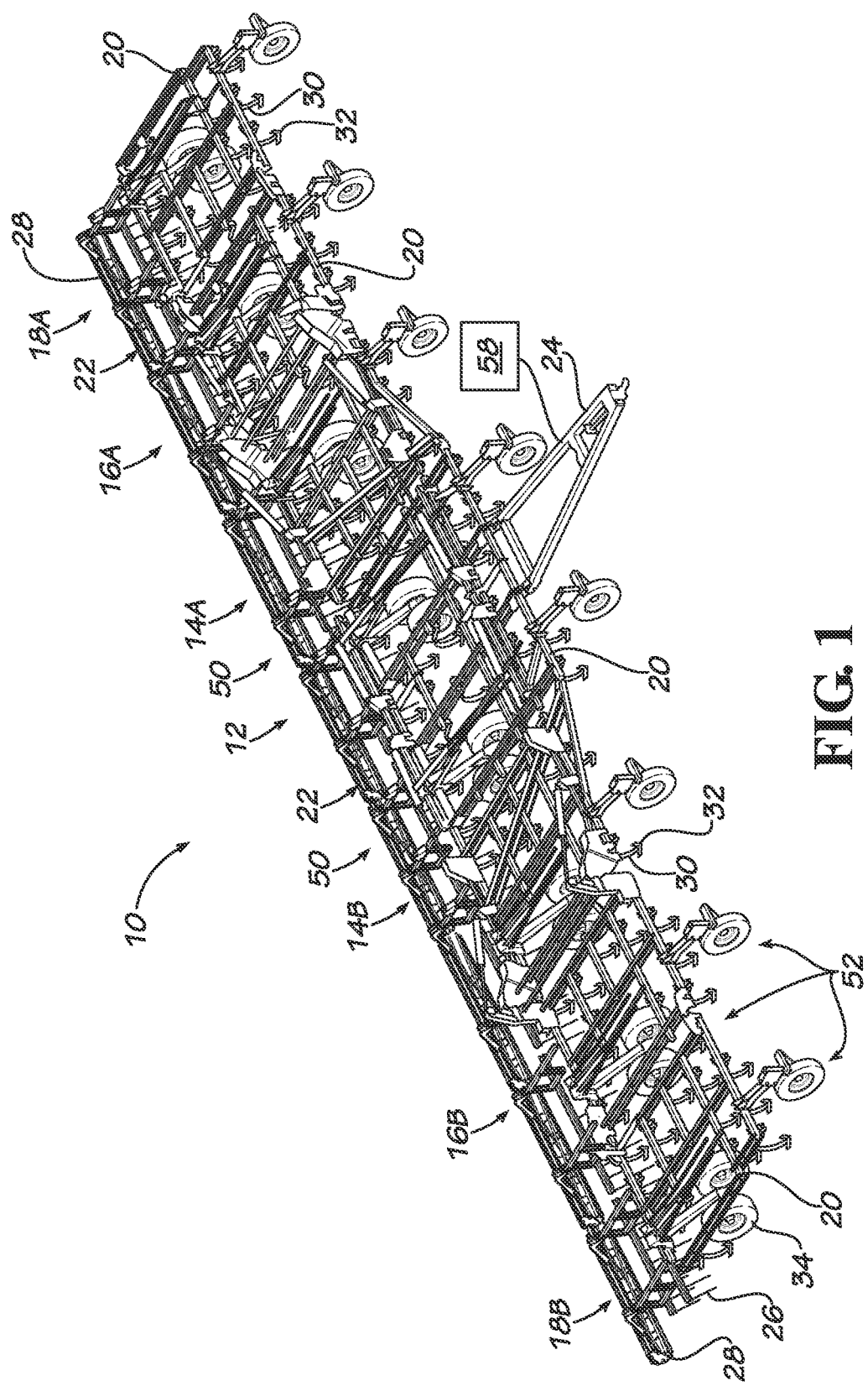
FIG. 1 is a top perspective view of an embodiment of an agricultural tillage implement of the present invention, in the form of a field cultivator, in an unfolded position.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding.

Field cultivator 10 is configured as a multi-section field cultivator, and includes a center frame section 12, also referred to as a main section 12, and a plurality of wing sections 14, 16 and 18. In the illustrated embodiment, field cultivator 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 extends forward from shank frame 20, and is coupled with the traction unit in known manner.

Rear auxiliary implement 22 includes a spring tooth drag 26 and a rolling (aka, crumbler) basket 28 which coact with each other to finish the soil. However, rear auxiliary implement 22 can be differently configured, such as a spike tooth drag, cultivator shanks, etc.

Figure 2:
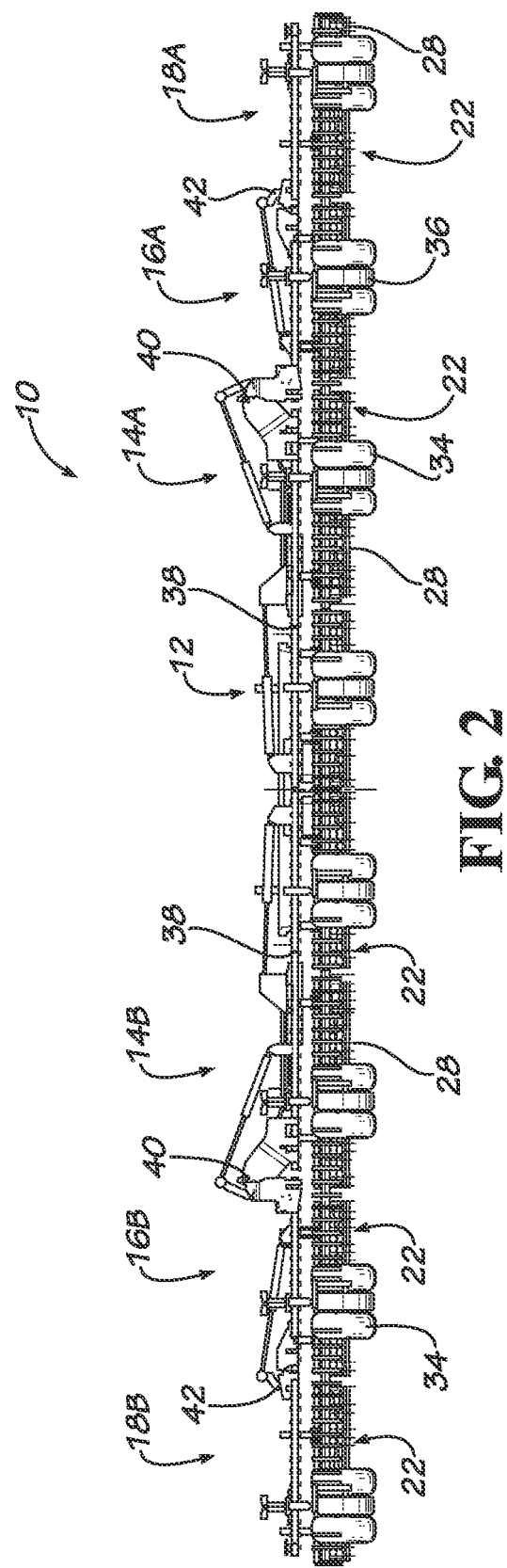
FIG. 2 is a front view of the field cultivator shown in FIG. 1.

Shank frame 20 generally functions to carry cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to level the shank frame 20 during a field operation.

Similarly, each inner wing section 14A and 14B, middle wing section 16A and 16B, and outer wing section 18A and 18B includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

Figure 3:
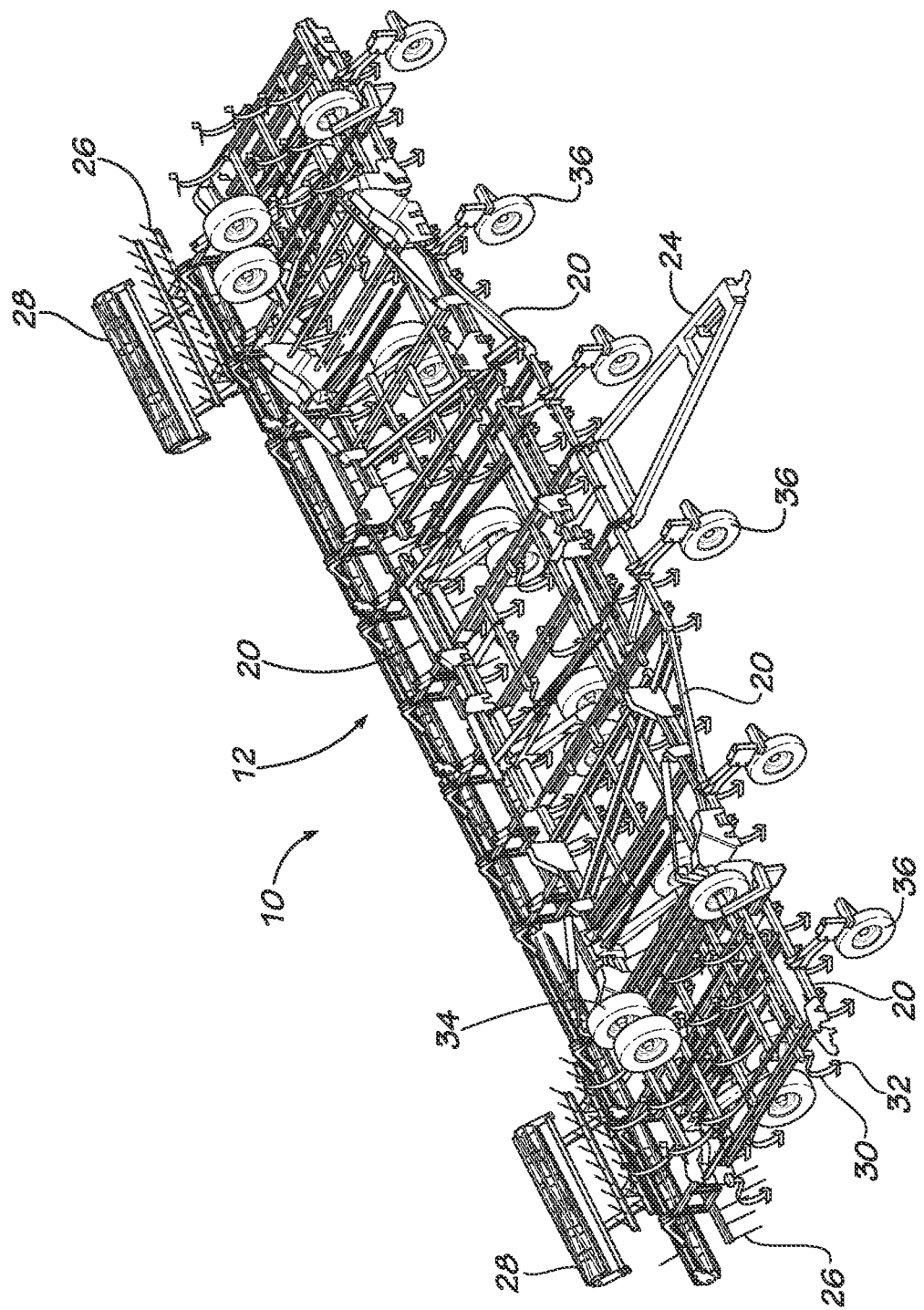
FIG. 3 is a top perspective view of the field cultivator shown in FIGS. 1-2, with the outer wing sections folded to a transport position.
Figure 4:
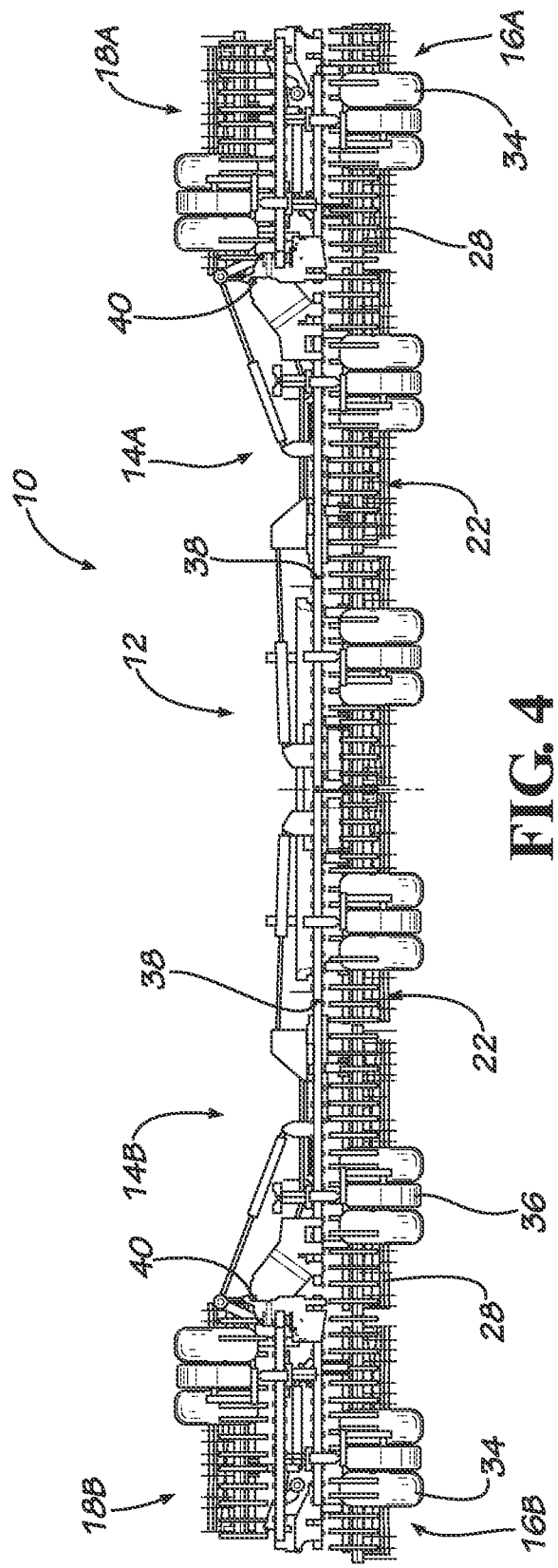
FIG. 4 is a front view of the field cultivator shown in FIG. 3, with the outer wing sections folded to the transport position.
Figure 5:
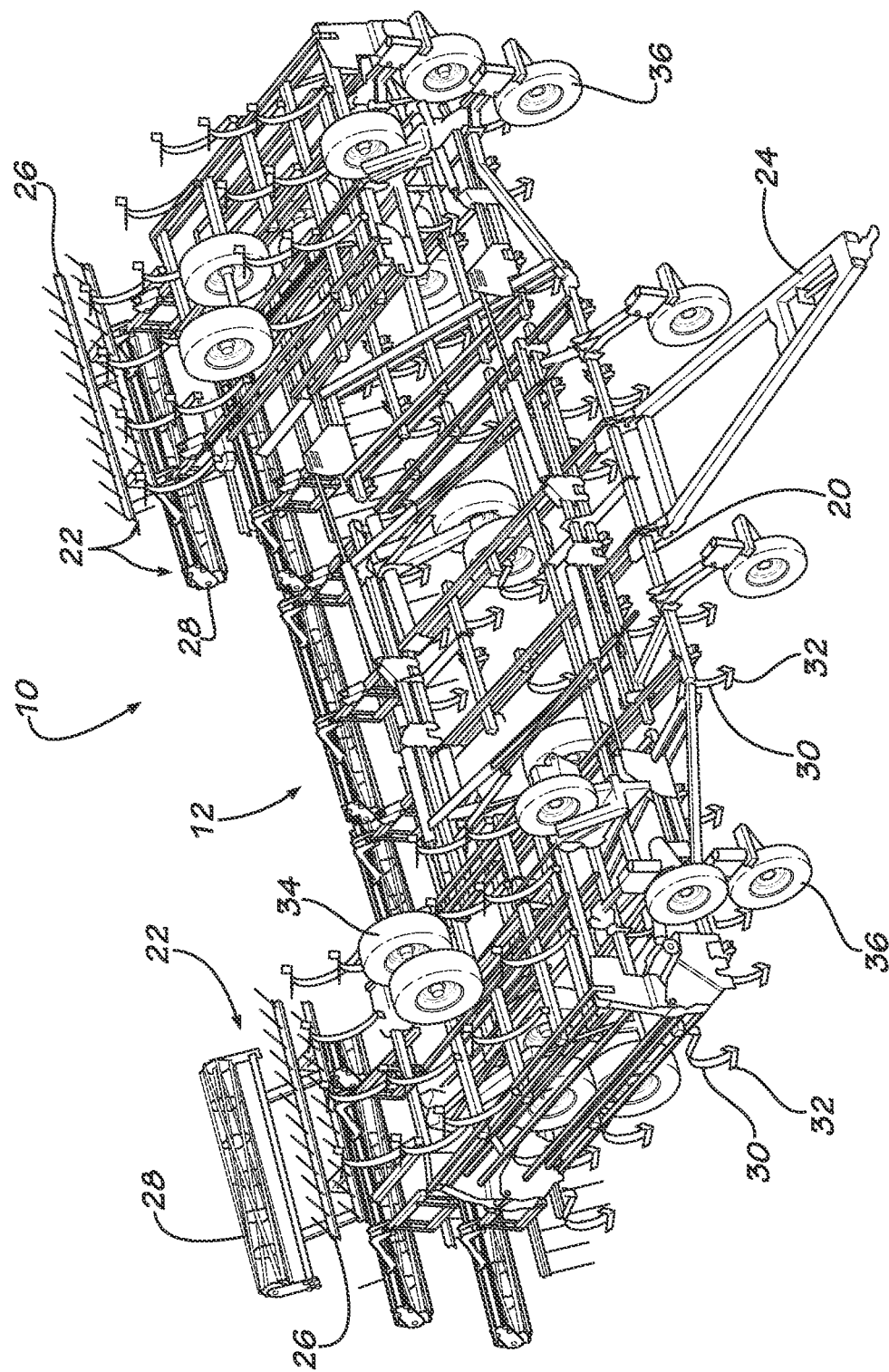
FIG. 5 is a top perspective view of the field cultivator shown in FIGS. 1-4, with the middle wing sections folded to a transport position.
Figure 6:
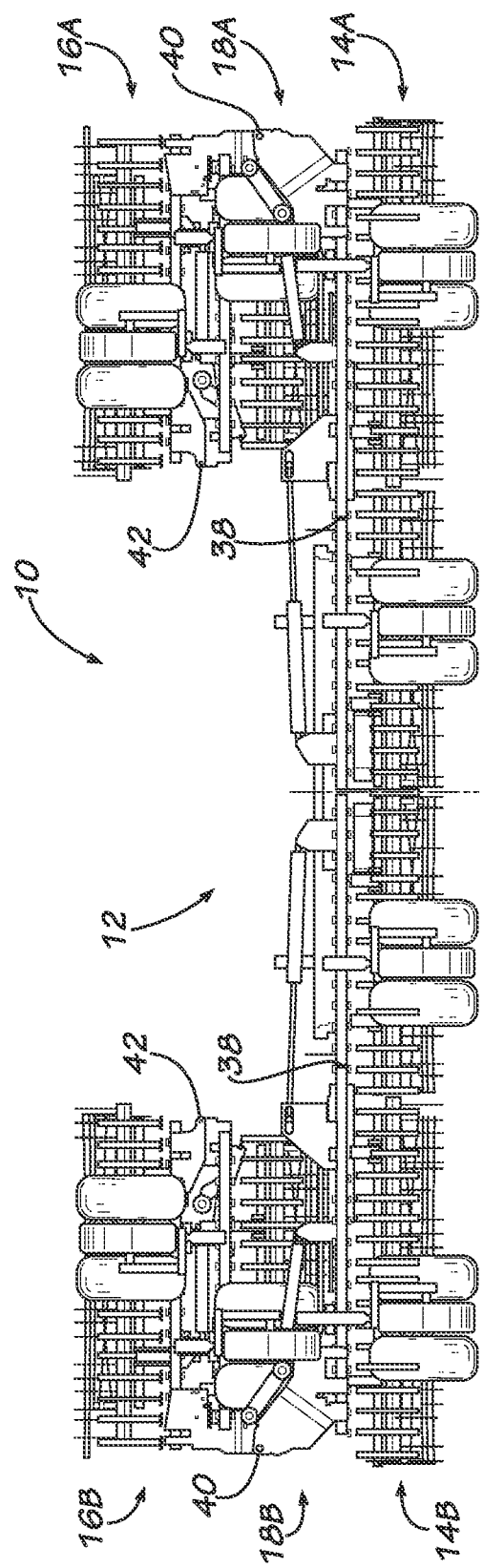
FIG. 6 is a front view of the field cultivator shown in FIG. 5, with the middle wing sections folded to the transport position.
Figure 7:
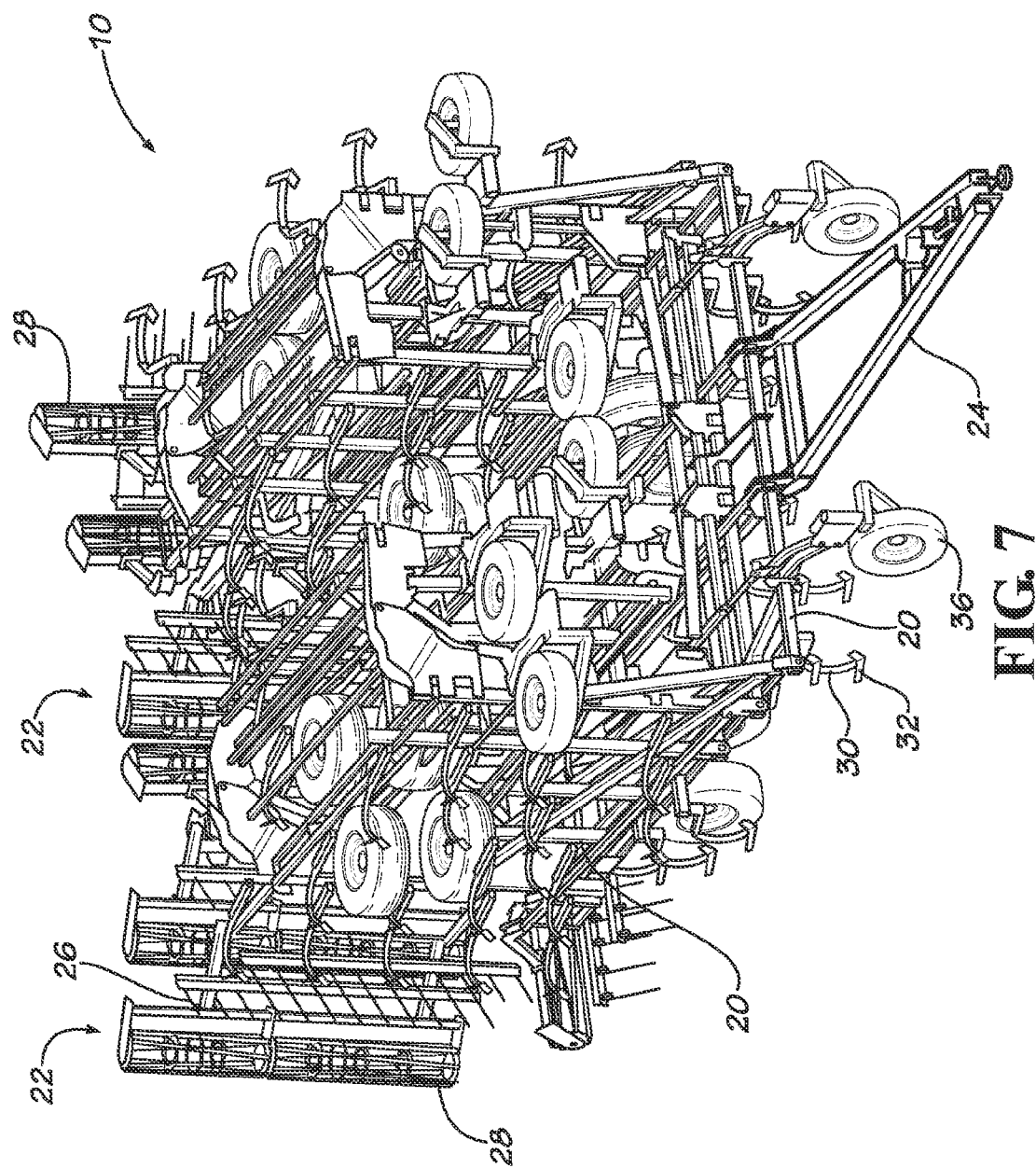
FIG. 7 is a top perspective view of the field cultivator shown in FIGS. 1-6, with the inner wing sections folded to a transport position.
Figure 8:
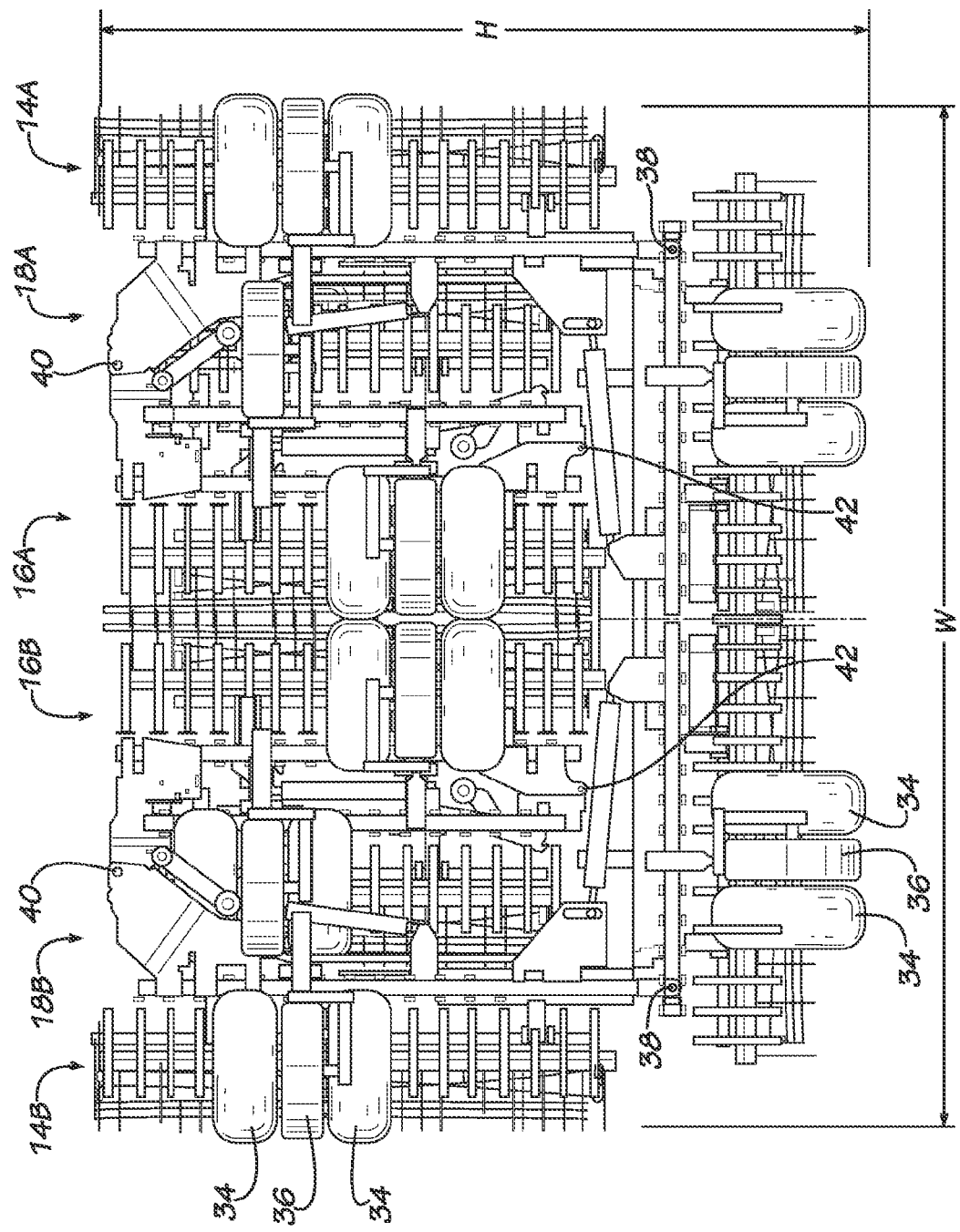
FIG. 8 is a front view of the field cultivator shown in FIG. 7, with the inner wing sections folded to the transport position.

During use, it is periodically necessary to move the field cultivator 10 from an unfolded (operating) position to a folded (transport) position. First, each outer wing section 18A and 18B is folded laterally inward and over a respective middle wing section 16A and 16B (FIGS. 3 and 4). With the outer wing sections 18A and 18B in the folded state, each middle wing section 16A and 16B is then folded laterally inward and over a respective inner wing section 14A and 14B (FIGS. 5 and 6). With the middle wing sections 16A and 16B in the folded state, each middle wing section 16A and 16B is then folded laterally inward and over the center frame section 12 (FIGS. 7 and 8). To unfold the field cultivator 10 and transform back to the field or operating position shown in FIGS. 1 and 2, the folding sequence described above is simply reversed.

The outer wing sections 18, middle wing sections 16 and inner wing sections 14 are stacked together in a vertically arranged stack over the center frame section 12 when in the folded state. To allow this type of nested stacking configuration, each of the wing sections 14, 16 and 18 have a pivot axis 38, 40 and 42, respectively, which is vertically offset to allow the wing sections to lie flat against the laterally inward shank frame 20/frame section 12 when in the folded state. The middle wing sections 16 have a pivot axis 40 that is vertically higher than pivot axes 38 and 42 of adjacent wing sections 14 and 18, when in the unfolded state.

Different countries and states have different regulatory highway requirements concerning oversized vehicles on the road. In the US, some states exempt agricultural equipment from such regulations, while others require that any type of vehicle on a road must comply with the oversized vehicle regulations. In Europe, the regulations may be more strict concerning the height and width of vehicles which may travel on a road without being accompanied by an escort vehicle. With the triple-fold field cultivator 10 of the present invention, the overall frontal profile dimensions when in the folded state fit within regulatory requirements for both the US and Europe. More particularly, with all of the wing sections 14, 16 and 18 in the folded state, the field cultivator 10 is then in a transport position with an overall frontal profile having dimensions with a maximum width "W" of no greater than approximately 20 feet, preferably approximately 18 feet wide, and a height "H" of no greater than approximately 14 feet, preferably approximately 13 feet, 6 inches high (FIG. 8).

These maximum frontal profile dimensions include all of the shank frames 20, shanks 30, rear lift wheels 34 and front gauge wheels 36, when in the folded state. The rear auxiliary implements 22 are considered to be add-ons to the main field cultivator 10, and may be outside these overall frontal profile dimensions, at least if not folded upwardly for the transport position. However, it is the intention that all of field cultivator 10, including the rear auxiliary implements 22, be within these maximum frontal profile dimensions when in the transport position.

Main section 12 is shown in FIG. 1 with wheel assemblies 50 and wheel assemblies 52 associated with wing sections 14, 16 and 18. Wheel assemblies 50 and 52 are used to control the tilling depth of implement 10 and are coordinated in the folding process.

Figure 9:
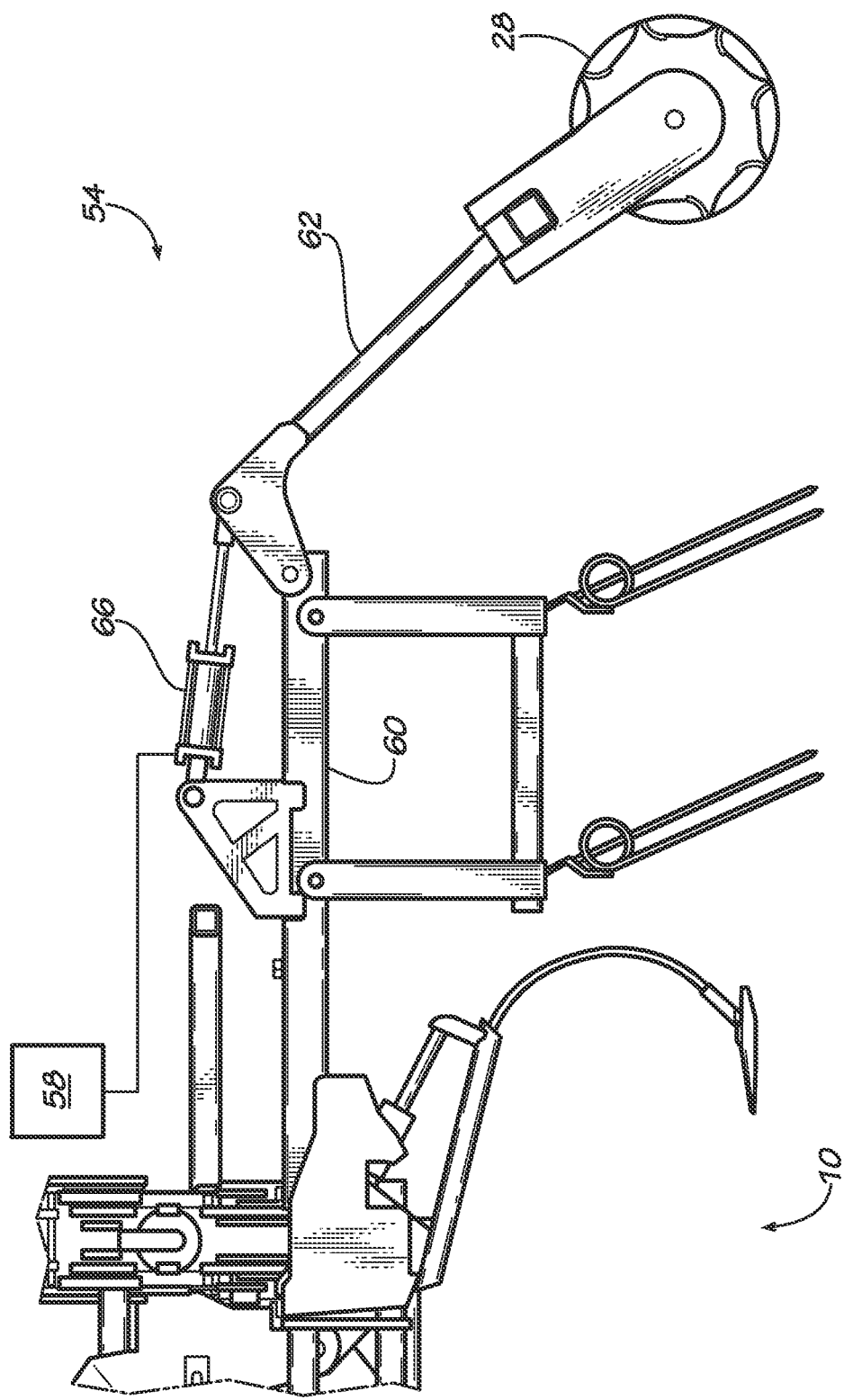
FIG. 9 is a side view of an auxiliary implement assembly in the form of a rolling basket assembly of the field cultivator of FIGS. 1-8.
Figure 10:
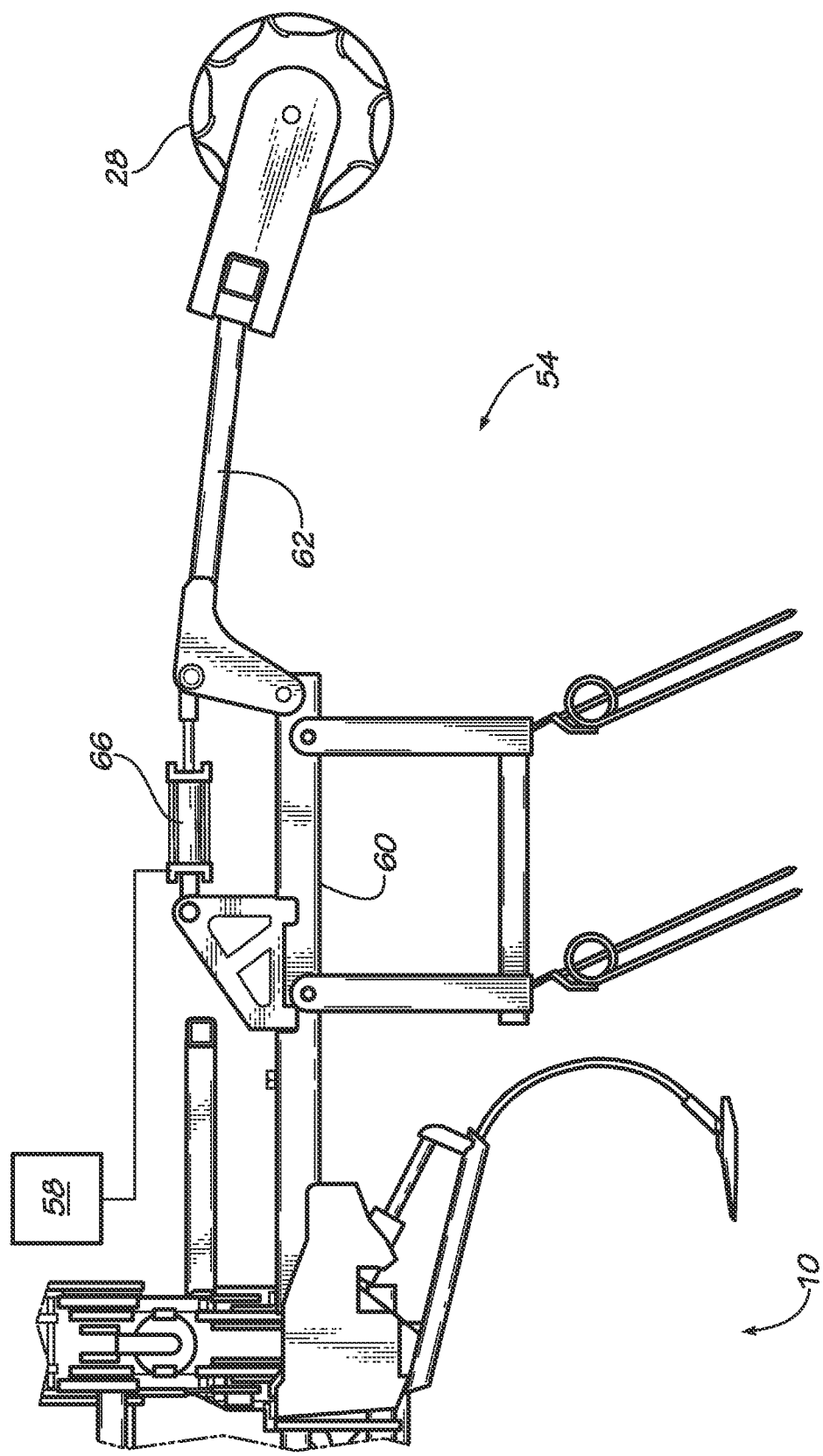
FIG. 10 is another view of the rolling basket assembly of FIG. 9.

Now, additionally referring to FIGS. 9 and 10, there is shown further details of implement 10, and for the purpose of explaining the present invention that further coordinates the actions of auxiliary implement 22 during the folding process as implement 10 transitions to the transport mode. FIGS. 9 and 10 show a representative auxiliary implement 22 shown in profile.

A typical auxiliary implement 22 is shown for wing sections 14, 16 and 18 in FIGS. 9 and 10 in the form of a rolling basket assembly 54. A controller 58, which can also be described as a control system, orchestrates the movement of rolling basket assemblies 54 while in the field and transport modes and during the transition to/from the field and transport modes. Rolling basket assembly 54 includes support members 60, pivotal arms 62, a rolling basket 28 and actuators 66. Although FIGS. 9 and 10 are in profile and only one support member 60, one pivotal arm 62, one rolling basket 28 and one actuator 66 is seen, it is recognized in the other figures that each rolling basket assembly 54 may have more than one of each of these items. Rolling basket 28 is a ground contacting implement used to reduce the size of clods of dirt and to cause the finer earth particles to be placed beneath coarser particles to improve the seedbed.

Actuators 66, are under the independent and individual control of controller 58 so that as sections 14-18 are folded, in a transition from the field mode to the transport mode, pivotal arms 62 are positioned so that rolling basket assemblies 54 do not interfere with each other in the process. This effectively alters the profile of each rolling basket assembly 54 associated with each wing section 14-18 as that particular wing section is folded. While controller 58 may be a set of valves manually controlled by an operator, it is contemplated that controller 58 would be an electronic control system that controls the sequence of positioning rolling basket assemblies 54 of each wing section, as it is being folded by the actuators used for the purpose of folding wing sections 14-18. It is contemplated that sensors, not shown, will be utilized as a part of the control process.

The present invention advantageously independently controls the position of pivotal arms 62 and hence the position of rolling baskets 28 while implement 10 is in the field mode. The present invention controls rolling basket assemblies 54 in the folding process of implement 10 to preclude the rolling basket assemblies 54 from interfering with each other as each wing section 14-18 is folded for transport and the process is reversed when implement 10 transitions from the transport mode to the field mode.

During the folding sequence rolling baskets 28 would interfere with each other if left in a lowered position as shown in FIG. 9. As can be variously seen in FIGS. 3-8 rolling basket assemblies 54 are controlled as sections 14-18 are folded, by substantially raising rolling baskets 28 to the position as illustrated in FIG. 10. The words "raise" or "raising" are used herein to indicate the movement of rolling basket 28 relative to the wing section to which it is attached, and as a particular wing section 14-18 is transitioned to/from the transport mode the raising of rolling basket 28 may actually be in a direction that is not away from the ground. It is also contemplated to put rolling baskets 28 in a non-interfering position, such as an intermediate position during the folding sequence rather than a substantially raised position.

As the folding process proceeds rolling baskets 28 may be in an lowered position, such as that shown in FIG. 9, which represents a position in which rolling baskets 28 are disengaged from the ground by the action of extending the wheels, which may be likewise under the control of controller 58. As a particular wing section 14-18 starts to fold, controller 58 causes the actuators 66 associated with that wing section to retract to thereby raise rolling basket 28 to avoid a conflict with other rolling baskets 28 of adjacent wing sections. This sequence allows rolling baskets 28 to not engage the ground as the folding process is initiated, then as the rolling basket 28 is elevated by the pivoting folding operation of the wing section, the rolling basket 28 may continue to be raised and then held in that position. This advantageously allows the rolling baskets 28 to be positioned while the folding is taking place to thereby modify the profile of the auxiliary implement as the wing sections are folding.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a main section including a pull hitch extending in a travel direction;
   a plurality of foldable wing sections coupled with said main section;
   at least one auxiliary implement assembly coupled to each of said wing sections, each said auxiliary implement assembly including:
      at least one support member;
      at least one pivotal arm pivotally coupled to said support member;
      at least one actuator coupled to both said support member and said pivotal arm; and
      a ground contacting implement coupled to said pivotal arm; and
   a control system configured to actuate said actuators to control a position of each said ground contacting implement in each of said sections when the agricultural implement is transitioning to a transport mode.

2. The agricultural tillage implement of claim 1, wherein said control system is additionally configured to actuate said actuators to position said ground contacting implement in a non-interfering position relative to an adjacent ground contacting implement when the agricultural implement is being put into the transport mode.

3. The agricultural tillage implement of claim 2, wherein each of said actuators are independently extendable and retractable.

4. The agricultural tillage implement of claim 3, wherein said actuators are positionable to thereby substantially raise the ground contacting implement during said transitioning.

5. The agricultural tillage implement of claim 4, wherein said plurality of foldable wing sections include a plurality of foldable wing sections on each side of said main section, including an outer wing section furthest from said main section when in a field mode and an inner wing section closest to said main section when in the field mode.

6. The agricultural tillage implement of claim 5, wherein said outer wing section is configured to fold to be generally perpendicular to said main section and to be generally parallel to said inner wing section when the implement is in the transport mode.

7. The agricultural tillage implement of claim 6, wherein said control system independently controls said actuators of each said auxiliary implement as said wing sections are moved from the field mode to the transport mode.

8. The agricultural tillage implement of claim 6, wherein said control system independently controls said actuators of each said auxiliary implement as said wing sections are moved from the transport mode to the field mode.

9. The agricultural tillage implement of claim 1, wherein said ground contacting implement is a rolling basket.

10. A control system of an agricultural tillage implement, the implement having a main section including a pull hitch extending in a travel direction, a plurality of foldable wing sections coupled with the main section and at least one auxiliary implement assembly coupled to each of the wing sections, each auxiliary implement assembly including at least one support member, at least one pivotal arm pivotally coupled to the support member, at least one actuator coupled to both the support member and the pivotal arm and a ground contacting implement coupled to the pivotal arm, the control system comprising a controller configured to actuate the actuators to control a position of each ground contacting implement in each of the sections when the agricultural implement is transitioning to a transport mode.

11. The control system of claim 10, wherein said controller is additionally configured to actuate the actuators to position the ground contacting implement in a non-interfering position relative to an adjacent ground contacting implement when the agricultural implement is being put into the transport mode.

12. The control system of claim 11, wherein each of the actuators are independently extendable and retractable under direction of said controller.

13. The control system of claim 12, wherein the actuators are positionable to thereby substantially raise the ground contacting implement during said transitioning.

14. The control system of claim 13, wherein the plurality of foldable wing sections include a plurality of foldable wing sections on each side of the main section, including an outer wing section furthest from the main section when in a field mode and an inner wing section closest to the main section when in the field mode.

15. The control system of claim 14, wherein the outer wing section is configured to fold to be generally perpendicular to the main section and to be generally parallel to said inner wing section when the implement is in the transport mode.

16. The control system of claim 15, wherein said controller is further configured to independently control the actuators of each auxiliary implement as the wing sections are moved from the field mode to the transport mode.

17. The control system of claim 15, wherein said controller is further configured to independently control the actuators of each auxiliary implement as the wing sections are moved from the transport mode to the field mode.

* * * * *